United States Patent
Drees et al.

[11] Patent Number: 5,867,384
[45] Date of Patent: Feb. 2, 1999

[54] FEEDBACK CONTROLLER

[75] Inventors: Kirk H. Drees, Cedarburg; Nebil Ben-Aissa, Franklin; John E. Seem, Shorewood, all of Wis.

[73] Assignee: Johnson Services Company, Milwaukee, Wis.

[21] Appl. No.: 889,682

[22] Filed: Jul. 8, 1997

[51] Int. Cl.⁶ .................................................. G05B 13/02
[52] U.S. Cl. ........................................... 364/162; 364/179
[58] Field of Search ...................... 364/148.01, 152–157, 364/160–63, 166, 176–179; 318/135, 636, 609, 610, 561

[56] References Cited

U.S. PATENT DOCUMENTS

| | | | |
|---|---|---|---|
| 4,349,868 | 9/1982 | Brown | 364/157 |
| 4,758,943 | 7/1988 | Astrom et al. | 364/157 |
| 5,270,631 | 12/1993 | Takahashi et al. | 318/135 |

*Primary Examiner*—Paul P. Gordon
*Assistant Examiner*—Steven R. Garland
*Attorney, Agent, or Firm*—Quarles & Brady

[57] ABSTRACT

A closed loop feedback control system that operates to maintain a process variable at or near a process variable setpoint. The system includes a setpoint regulator that adjusts the value of a process variable in response to a setpoint associated therewith. A sensor associated with the setpoint regulator senses the process variable and outputs a process variable signal corresponding thereto. A controller connected to both the setpoint regulator and the sensor in a closed loop is programmed with PID logic to control operation of the setpoint regulator in response to the process variable signal received from the sensor. The controller generates a control signal that controls the setpoint regulator based on a non-uniform two-point sampling of the process variable signal. The controller delivers smooth, bump-free, control in spite of changes in the setpoint controller gains or system parameters. A digital filter is also implemented with the controller of the present invention to filter the process variable signal input into the controller. The filter includes both an amplitude to clip signal spikes and glitches and a low pass frequency filter to remove higher order noise-related frequencies from the signal, thereby reducing system memory requirements and increasing system computational speed.

26 Claims, 10 Drawing Sheets

— FILTER INPUT
— FILTER OUTPUT
— ACTUAL PROCESS

FIG. 7

— FILTER OUTPUT
-- ACTUAL PROCESS

—— PROCESS [0.05 Hz]
—— FILTER OUTPUT [NOISE@0.4Hz]

FEEDBACK CONTROLLER

TECHNICAL BACKGROUND

The present invention relates generally to closed loop feedback control systems, and more particularly to a PID controller that is based on a non-uniform two-point sampling methodology, that generates a smooth control output signal regardless of changing control conditions and parameters, and that utilizes trapezoidal integration techniques to insure loop control accuracy and stability. The smooth control output signal is generated from an input signal that is filtered through a digital filter including both an adaptive amplitude filter and a low pass frequency filter.

BACKGROUND OF THE INVENTION

Digital closed loop feedback systems are commonly used to maintain a process variable, such as a zone temperature, at or near a system setpoint. One of the most common digital closed loop feedback systems is the proportional-integral-derivative (PID) feedback system that generates a control signal formed from a combination of proportional, integral and derivative function outputs. The proportional function is programmed into the controller to generate an output that is proportional to the deviation of the process variable from the setpoint. The integral function is programmed into the controller to generate an output that guarantees the process variable is adjusted to reach the setpoint in a steady state. The derivative function is programmed into the controller to improve closed loop stability, and thus controller performance function, by reducing controller response time.

While conventional closed loop PID control systems provide acceptable performance, there is still room for improvement in the art. For example, conventional PID controllers typically exhibit a bumpy output, or considerable overshoot and undershoot around setpoint, upon being released from an override condition, after the proportional controller gain is changed, after the controller is switched from a disabled to an enabled state, or after a change in setpoint. In addition, the integral function of a conventional PID controller is typically implemented through a rectangular integration methodology that may cause loop instability if the particular integral time is less than the controller sample time. Also, conventional PID controllers programmed with conventional rectangular integration techniques exhibit a delay in returning to control after reaching saturation at the controller high or low limit. Further, the derivative function requires a conventional PID controller to sample and execute on a fixed interval of multiple sample points. The derivative function accuracy is also often affected by a noisy system process or measurement.

A conventional PID controller receives process variable data from a zone sensor or transducer. Typically, the signals received from the sensor or transducer contain information about the actual value of the process variable, as well as extraneous noise components. These noise components emanate from natural sources, such as air turbulence, or from artificial sources, such as electrical noise. Typically, the frequency of the signal noise components is much higher than the frequency of the actual process information. Signal spikes which are often caused by a brief communications failure, spurious electrical signals in the sensor environment, or an intermittent instrumentation fault, all of which may show up in the sensor or transducer signal.

SUMMARY OF THE INVENTION

Accordingly, the present invention provides a closed loop PID control system that overcomes the above limitations associated with conventional closed loop PID control systems. The system controller exhibits a bumpless output subsequent to controller parameter changes. The controller, without operator intervention, will smoothly compensate its output to deliver a smooth response when controller gains and parameters are changed. The PID controller of the present invention utilizes a trapezoidal integration technique to calculate an integral contribution to the output that has a second order accuracy and that does not require a fixed interval sampling, as compared to conventional first order accuracy associated with the rectangular integration techniques of conventional controllers. The integral contribution of the controller output of the present invention also does not oscillate or cause a delay in returning to control after having saturated at either its high or low limit, as the integral contribution is reset upon reaching saturation.

The derivative contribution to the controller output also provides a bumpless change in the output, following a change in setpoint, by using the process variable measurement instead of controller error in the finite difference approximation to the derivative contribution. The finite difference approximation for this derivative calculation does not require the controller to sample and execute on a fixed interval. The derivative contribution of the controller output is also based on a modified implementation which limits the derivative contribution to reduce difficulties caused by a noisy process or measurement.

The controller of the present invention is also programmed with a built-in saturation detection function that can be used for control flow or logic coordination with other controllers or devices. The controller also uses this feature to prevent overintegration, or windup, when it reaches the control output limits.

More particularly, the present invention provides a closed loop feedback control system, and associated methodology, that operates to maintain a process variable at or near a process variable setpoint. The system includes a setpoint regulator that adjusts the controller output and ultimately the value of a process variable in response to a setpoint associated therewith. A sensor associated with the setpoint regulator senses the process variable and outputs a process variable signal corresponding thereto. A controller connected to both the setpoint regulator and the sensor in a closed loop is programmed with PID logic to control operation of the setpoint regulator in response to the process variable signal received from the sensor. The controller generates a control signal that controls the setpoint regulator based on either a uniform or a non-uniform two-point sampling of the process variable signal.

In addition, the present invention provides an improved digital filter that filters the signal input from the system sensor to thereby improve the signal signature and thus the system accuracy. The improved digital filter of the present invention significantly reduces both high frequency noise and noise attributed to unrealistic changes in signal amplitude without introducing a significant phase lag into the measurement signal.

In particular, the present invention provides a digital filter including an input for receiving a linearized input signal. An amplitude filter includes an adjustable window that allows small changes in the input signal input but clips large changes. An $n^{th}$ order low pass digital filter is coupled to the amplitude filter and filters the clipped signal input from the amplitude filter. The $n^{th}$ order low pass digital filter removes higher frequency signals from the input signal, thereby increasing system computational speed and reducing system memory requirements.

These and other various advantages and features of the present invention will become apparent from the following description and claims, in conjunction with the appended drawings.

DETAILED DESCRIPTION OF THE PREFERRED EMBODIMENTS

Figure 1:
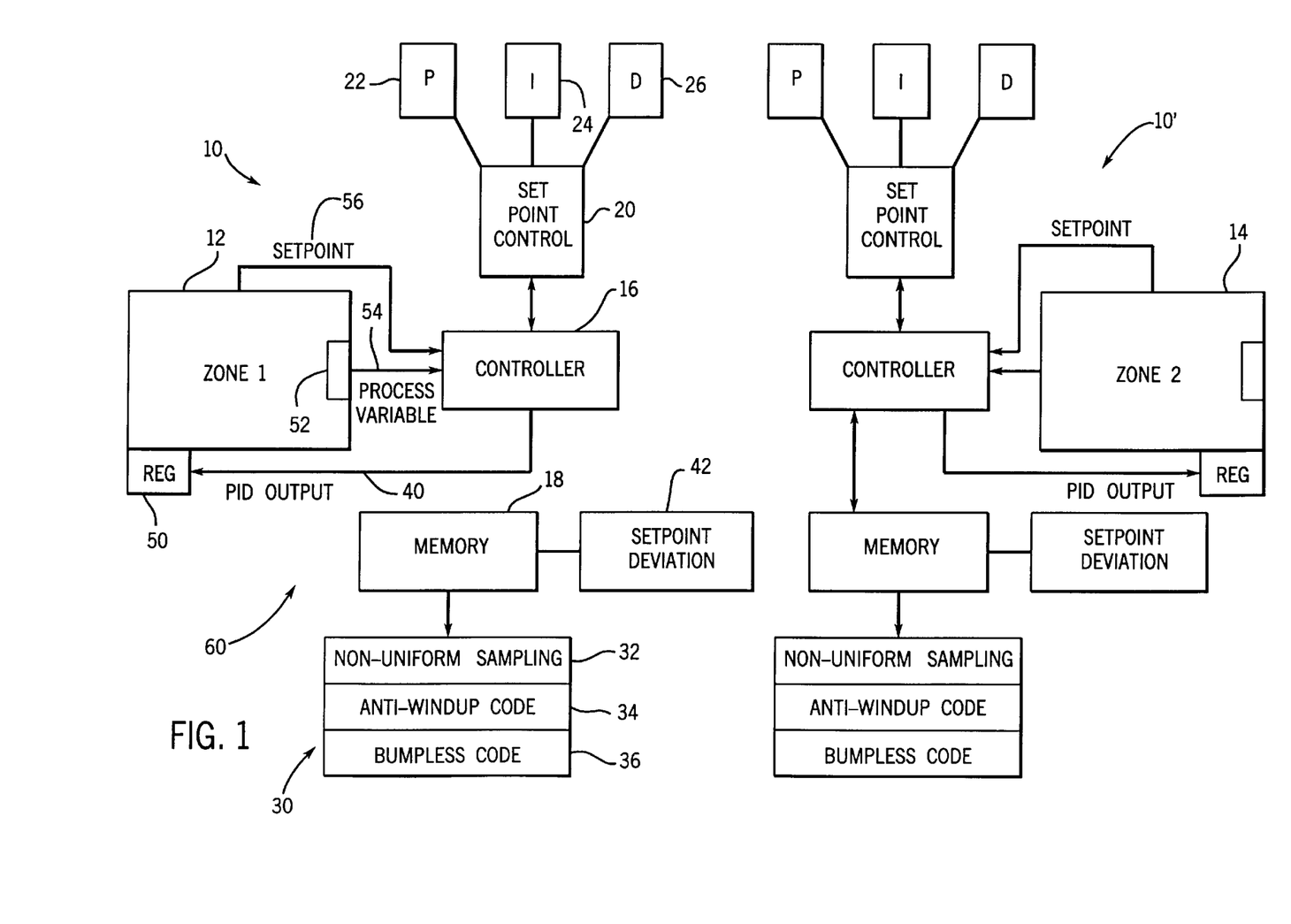
FIG. 1 is a block schematic diagram of an improved feedback control system according to a preferred embodiment of the present invention.

Referring to FIG. 1, an overall block schematic diagram of feedback control systems of the present invention are shown generally at 10 and 10'. The systems are used to satisfy the temperature setpoint associated with particular dedicated temperature zones, such as the zone 12 and the zone 14, based on the deviation between a measured zone temperature and the zone setpoint temperature, as will be set forth in detail below. For purposes of further discussion, reference will be made only to temperature control of the zone 12, as the control scheme for both zones 12 and 14 is identical.

Control System

The system 10 includes a controller 16 having an associated memory 18. The controller is programmed with a setpoint control logic, indicated generally at 20, that is implemented through a combination of proportional, integral and derivative control functions. The proportional control function is represented at 22; the integral function is represented at 24, and the derivative function is represented at 26. The memory 18 is programmed through programming techniques well known in the art and includes a block of control code 30. The block of control code 30 includes a non-uniform sampling code block 32 that allows the PID setpoint control logic, and specifically the integral and derivative functions, to operate on non-uniform sampling intervals, which provides a specific advantage over prior known conventional PID control schemes. The non-uniform sampling code block 32 enables the integral contribution 24 to be calculated with a second order accuracy. The controller therefore is not required to sample and execute on a fixed interval.

The non-uniform sampling is accomplished by programming trapezoidal integration logic into the controller memory 18. The trapezoidal integration logic provides a numerically more stable system than compared to conventional rectangular integration-based PID closed loop systems. The trapezoidal integration technique of the present invention, however, is a two-point method that requires just the current and previous process variable values for system operation and therefore does not require time intervals to be uniformly spaced. The non-uniform sampling period therefore only requires the presently sensed process variable value and an immediately past sensed process variable value for system operation.

Also, the memory 18 is programmed with anti-windup code block 34 that improves output of the integral contribution 24 by avoiding saturation of the regulator 50 under control of the present system.

Further, the memory is also programmed with a bumpless code block 36 to insure that a PID output signal 40 output from the controller 16 is changed in a smooth, continuous manner to prevent undesirable oscillations of the control signal, after a change in the controller gain setting, or after the controller has been enabled after being disabled. The bumpless code block 36 is programmed to reset the integral contribution 24 as required to provide a smooth response after any of the above parameter changes.

The memory also stores a computed controller error 42 that is computed by computing the deviation of zone temperature from the setpoint control temperature, and that is utilized in the feedback control methodology of the present invention.

Still referring to FIG. 1, the controller maintains the temperature of the zone 12 at or near a zone temperature setpoint that is set by a zone regulator 50. The controller maintains this temperature through monitoring the zone temperature via a process variable sensor 52. The sensor 52 senses the process variable, or temperature, of the zone 12 and generates a corresponding electrical process variable signal (PV) that is fed back to the controller as indicated at 54. The controller also receives a setpoint signal (SP) 56 from a setpoint adjustment device located in zone 12 or from a programmed input. The controller processes the signals 54, 56 via the setpoint control logic 20 and the code 30 to generate the PID output control signal 40. The resulting closed loop system 60 effectively maintains the process variable of the zone 12 at or near the zone setpoint as set at the regulator 50.

As with conventional PID closed loop control systems, the PID control system of the present invention is programmed to maintain the process variable (temperature) close to a desired value (setpoint) regardless of the disturbances or variation in system dynamics. In the present invention, the controller output, generated by the control functions 22, 24, 26 is proportional to the measured deviation between the setpoint and process variable, the integrated value of the measured deviation, and the time derivative of the process variable signal 54. The contribution of the integral function 24 is added in the controller proportional output to guarantee that the process variable is changed to reach the setpoint at steady state. The contribution of the derivative function is added to the output signal 40 to improve stability of the closed loop signal, and improves controller response time through prediction of the PV signal 54 output from the sensor 52 via linear extrapolation, which is programmed into the setpoint control logic 20.

Figure 2A:
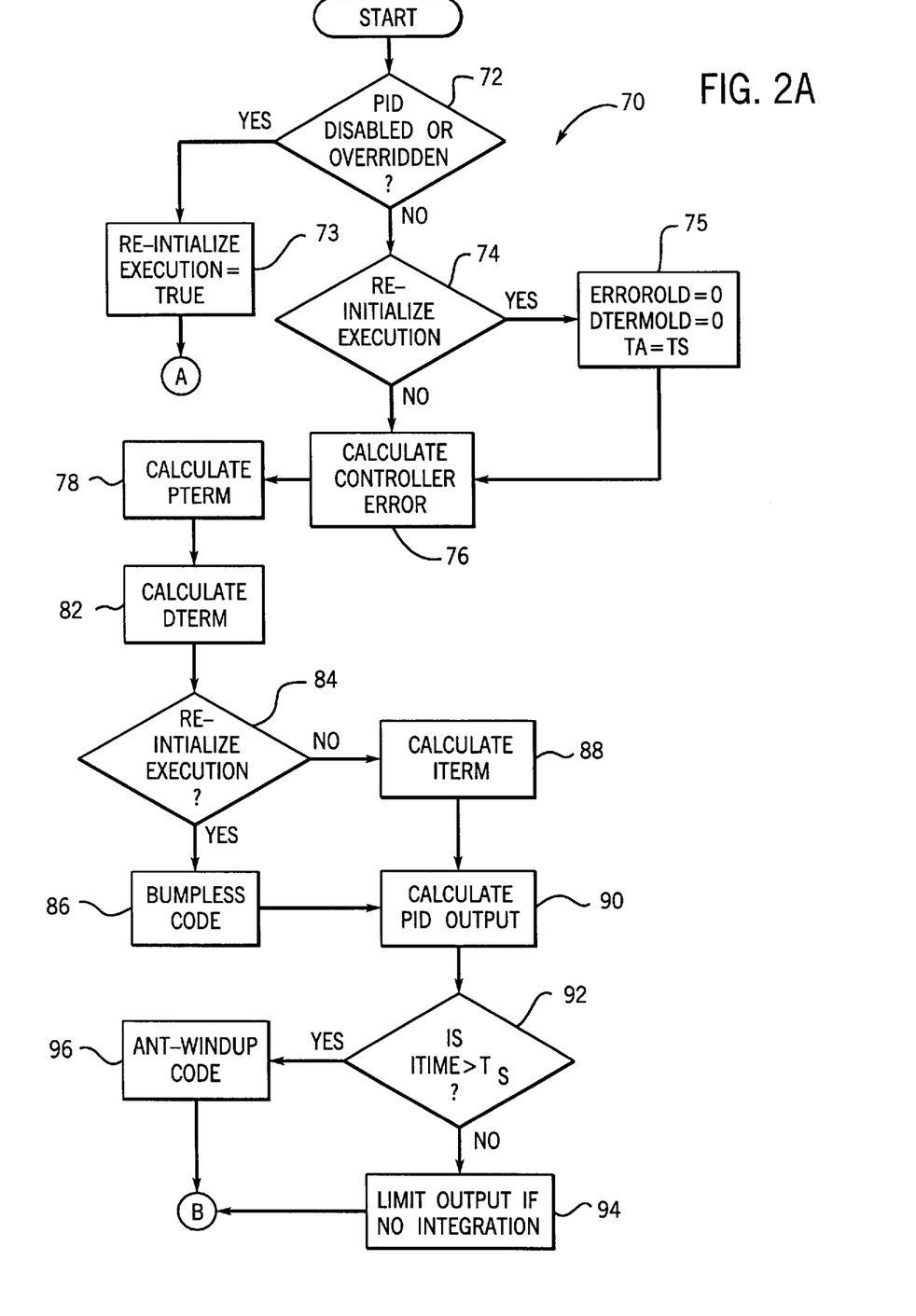
FIGS. 2A and 2B are a flow diagram illustrating the methodology of the feedback control system of FIG. 1.
Figure 2B:
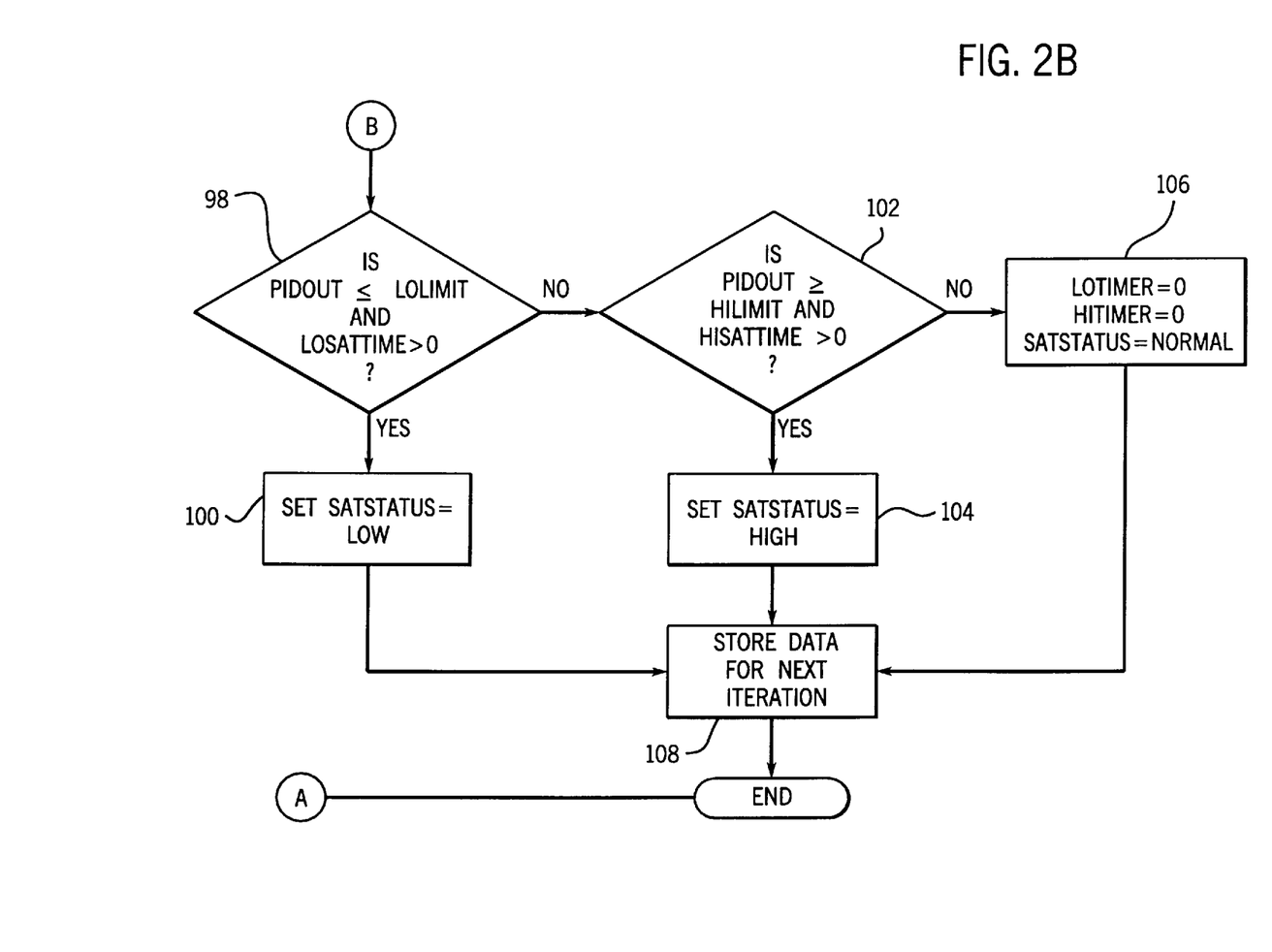

Referring to FIG. 2, a flow diagram illustrating the control system logic of the present invention is illustrated generally at 70. As will now be described, each block shown represents a specific set of instructions programmed into the controller.

The block 72 determines whether the control flow of the PID control system is currently disabled or overridden. If disabled, the PID output is held constant at its last enabled value, as indicated at block 73. The block 73 also maintains the PID output at the overridden value if the PID system is overridden.

After the controller is enabled or released from an override or disabled state, the block 74 redirects the control flow to block 75 on the first execution, as indicated by the pseudocode (Re_Initialize=TRUE). Under normal operation (Re_Initialize=FALSE) the control flow proceeds to block 76.

For the first execution after the controller is enabled or released from an override, the block 75 assigns reliable starting values for the $z^{-1}$ values of $E_c$ and the derivative response "DTerm." These values are required later for the derivative and integral response calculations. The variable "TA", which clocks the time between controller executions, is also forced to the desired execution time "TS." This prevents values of TA, which do not reflect the time between normal executions, from causing numerical problems with the integral and derivative response calculations. For the first execution after the controller is enabled or released from an override, TA normally is not appropriate since the controller may not have been executed for an extended time period.

Figure 3:
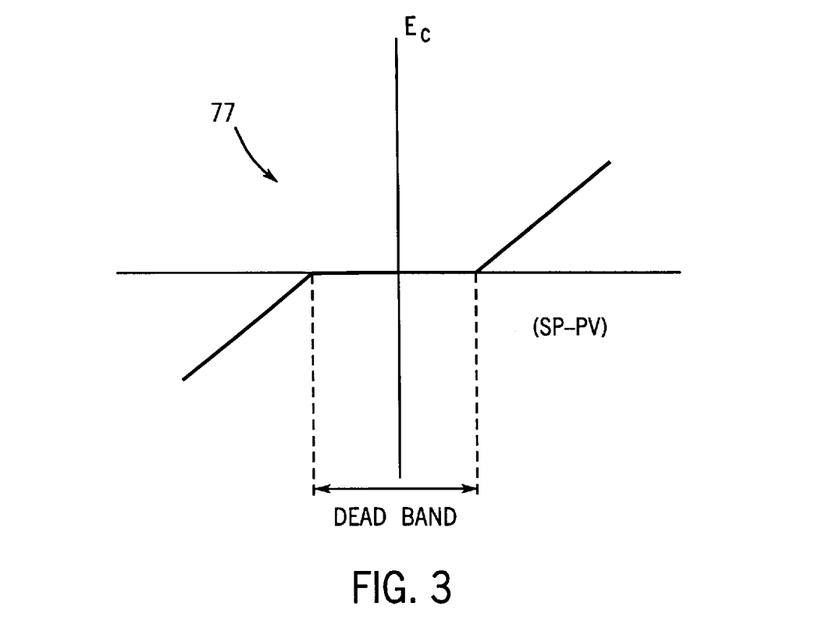
FIG. 3 is a graph of controller error as computed by the control system of the present invention.

The block 76 determines the controller error "$E_c$" used in calculating the controller output. The value of $E_c$ is directly proportional the difference between the setpoint and process variable (SP-PV) outside of a deadband. As shown at 77 in FIG. 3, inside the deadband, the value of "$E_c$" is zero. The deadband is used to reduce noise on the input signal from propagating through the controller. It is particularly useful if derivative control action is utilized since stability is gained and control effort is decreased by not responding to noise inside the deadband.

Figure 4:
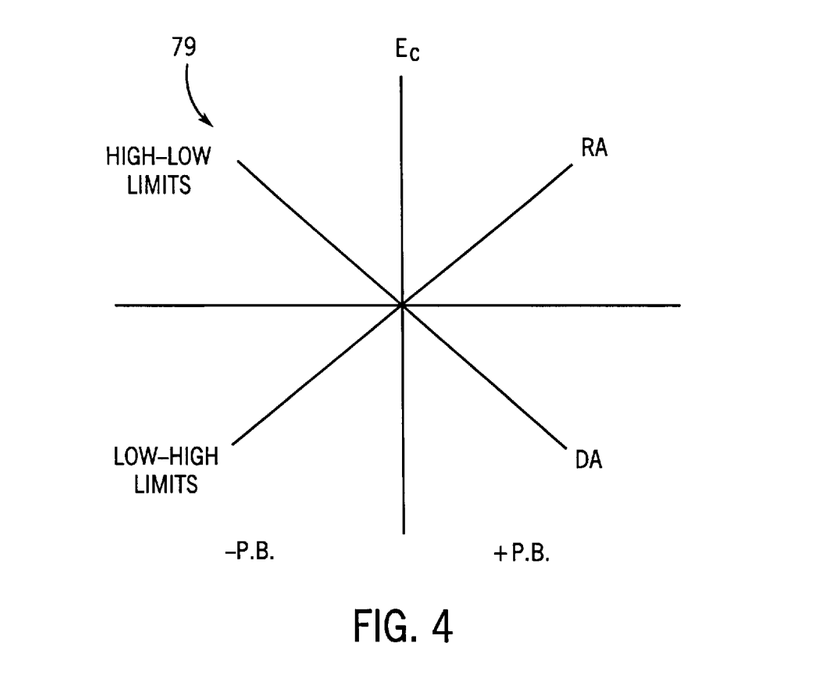
FIG. 4 is a graph of the proportional contribution to a control signal generated by the control system of the present invention.

The block 78 calculates the proportional response "PTerm." As shown at 79 in FIG. 4, the response is related to the value of the proportional band, high output limit, low output limit, $E_c$ and the controller action (Direct "DA" or Reverse "RA"), as indicated by the following equation:

$$PTerm = sign(Action) \times \left\{ \frac{Abs(K_p)}{K_p} \right\} \times E_c$$

where:

$$K_p = \left( \frac{HiLimit - LoLimit}{ProportionalBand} \right)$$

where the sign of the proportional gain "$K_p$" is a function of the controller action. If the controller is DA then the sign of $K_p$ is (−), if RA then the sign of $K_p$ is (+).

The block 82 calculates the derivative response "DTerm." There are three cases to consider. In the first case, an invalid (negative or zero) value for the derivative time forces of the derivative response to zero.

In the second case, the derivative response is forced to zero whenever SP-PV is less than or equal to the deadband/2 (or $E_c$=0). This reduces the possibility of noise causing the derivative response to create unnecessary and undesirable changes in the controller output.

In the third case (corresponding to a non-zero $E_c$ and a valid derivative time), a derivative response which is related to the time rate of change in the process variable is generated by the following equation:

$$\frac{DTime}{N} * \frac{d(DTerm)}{dt} + DTerm = -K_p * DTime * \frac{d(PV)}{dt}$$

The characteristic solution to this equation acts as a first order filter which limits the DTerm rate of change. The filter time constant is equal is DTime/N where N is in the range of 8<N<20. This filtering helps minimize noise amplification in the derivative estimate. The particular or forced solution of this equation is related to the time varying changes in the process variable PV.

The equation is implemented using the 1st order backward finite difference equations. This approach was chosen because it does not require the input values for the PV to be evenly spaced through time. This is very important since the controller execution interval may not be uniform (e.g. TA does not always equal TS). The recursive representation of this equation used in the implementation is given below.

$$DTerm = \\ -\frac{K_p * N * DTime}{DTime + N * \Delta t}(PV - PV_{old}) + DTerm_{old} * \frac{DTime}{DTime + N * \Delta t}$$

The DTerm is generated by the derivative function as illustrated by the following pseudocode:

```
if DTime <= 0
    then DTerm = 0
if abs (SP-PV) <= deadband/2
    then DTerm = DTermOld
if DTime >0 & abs(SP-PV) > deadband/2
    then K1 = DTime/(DTime + 8*TA)
    K2 = (8*Kp*DTime)/(DTime + 8*TA)
    DTerm = K1 *DTermOld-
    K2*((ErrorOld-Error) + (SP-SPOld))
```

After the DTerm is calculated, the block 84 redirects the control flow to block 86 on the first execution after the controller is enabled or released from an override. Under normal conditions the control flow would proceed to block 88.

The block 86 ensures that the controller output is "bumpless" (does not change in a discontinuous manner) when the control system is re-initialized from a disabled or overridden condition. A one time adjustment of the integral contribution "ITerm" contribution provides a smooth return to real time control. Pseudocode for the instruction block 86 is illustrated below:

```
ITerm = PVOld-(PTerm + DTerm + Offset)
Set: Re_Initialization = False
```

The block 88 calculates the ITerm under normal real time operating conditions. There are two cases to consider. In the first case, the ITerm is forced to zero if the integral time "ITime" is less than the desired sample time "TS." This prevents the possibility for numerical instability. In the second case, the controller error is integrated using trapezoidal integration. Trapezoidal integration provides better accuracy and numerical stability than rectangular integration which is commonly used in other controllers, and does not require setpoint error values to be evenly spaced through time. This is very important since the controller may not be executed with a uniform interval. The numerical implementation of the trapezoidal integration, in recursive form, is given below.

$$ITerm = ITermOld + \frac{K_p * TA}{2 * ITime} * (E_c - E_cOld)$$

Additionally, the ITerm is used to provide "bumpless" control whenever the controller gain is changed. This is highly desirable when tuning either manually or with an auto-tuning means. The bumpless adjustment is accomplished using the following equation.

$$ITerm=ITerm+(K_pOld-K_p)*E_c$$

The block 90 sums the proportional, integral, derivative, and offset contributions to generate the PID control signal output, as indicated by the following pseudocode:
PIDOut=PTerm+ITerm+DTerm+Offset The block 92 redirects the control flow to block 96 if the integral mode has a valid ITime and thus is enabled. If the integral mode is not enabled, the control flow proceeds to block 94.

As discussed previously, if ITime is ≦TS then the ITerm is forced to zero and there is no potential for integral windup. Therefore the purpose of the block 94 is to simply force the PID output to be between its high and low limits under all operating conditions, as indicated by the following pseudocode:

```
if PIDOut >= HiLimit
    then PIDOut = HiLimit
elseif PIDOut <= LoLimit
    PIDOut = LoLimit
```

When the integral action is active (ITime>TS), the block 96 prevents integral windup and dithering at the high or low output limits. Whenever the PID output exceeds the high limit it is clamped at the high limit. The output is also clamped at the high output limit if the value of PIDOld exceeds the high limit and the current value of PTerm exceeds 0. This prevents output dithering at the high limit caused by noise passing through the controller. Similar logic is used to prevent windup and dithering at the low output limit. Pseudocode for the block 96 is given below:

```
if ((PIDOut >= HiLimit) OR ((PIDoutold >= HiLimit) AND (PTerm > 0)))
    then ITerm = HiLimit - (PTerm + Dterm + Offset)
    PIDOut = HiLimit
elseif ((PIDOut <= LoLimit) OR ((PIDOutOld <= LoLimit) AND (PTerm < 0)))
then ITerm = LoLimit - (PTerm + DTerm + Offset)
    PIDOut = LoLimit
```

The block 98 redirects the control flow to block 100 if the PID output is less than or equal to the low output limit and the low saturation flag is enabled (LoSatTime≦0). Otherwise the control flow passes to block 102.

The block 100 is used to set the PID saturation status variable to (SatStatus+Low) if the PID output is continuously at its low limit for a time greater than or equal to LoSatTime. At each iteration, the variable LoTimer is incremented by the time elapsed from the last iteration. When LoTimer greater than or equal to LoSatTime, SatStatus is set to "Low," as indicated by the following pseudocode:

```
LoTimer = LoTimerOld + TA
HiTimer = 0
if LoTimer >= LoSatTime
    then SatStatus = Low Lotimer = LoSatTime
```

The block 102 redirects the control flow to block 104 if the PID output is greater than or equal to the high output limit and the high saturation flag is enabled (HiSatTime>0). Otherwise the control flow passes to block 106.

The block 104 is used to set the PID saturation status variable SatStatus+High if the PID output is continuously at its high limit value for a time greater than or equal to HiSatTime. At each iteration, the variable HiTimer is incremented by the time since the last iteration. When HiTimer greater than or equal to HiSatTime, SatStatus is set to "High." The pseudocode for block 104 is illustrated as follows:

```
HiTimer = HiTimerOld + TA
LoTimer = 0
if HiTimer >= HiSatTime
    Then HiTimer = HiSatTime
```

The block 106 sets the PID saturation status variable SatStatus=Normal if the PID output is between its high and low limits. It also clears the timers, LoTimer and HiTimer. The SatStatus variable is used to coordinate multiple PID algorithms to prevent undesired overlap.

In the block 108, the values of the following variables are stored for the next iteration.

| | | |
|---|---|---|
| PCOld = PV | ErrorOld = Error | KPOld = Kp |
| ITermOld = ITerm | DTermOld = DTerm | LoTimerOld = LoTimer |
| SPOld = SP | PTermOld = Pterm | HiTimerOld = HiTimer |

The methodology is then repeated in a manner consistent with the above-described control flow according to existing zone temperatures/setpoint conditions.

As can be appreciated from the foregoing description, the PID feedback control system of the present invention utilizes trapezoidal integration to provide a greater degree of accuracy to the control signal when compared to conventional rectangular integration based PID control systems. The control system of the present invention utilizes a two point sampling method that obviates the need for evenly spaced sample time intervals, thereby providing a higher degree of system flexibility. The control system of the present invention also utilizes programming techniques that insure a smooth transition to setpoint despite various system disturbances and parameter changes. The control system of the present invention is therefore more flexible and more economic to implement than conventional PID based closed loop control systems.

While the control system of the present invention has been described in conjunction with a zone temperature control system, it should be appreciated that the system may be used to regulate a process variable at or near a setpoint for any closed loop control application, including pressure, flow, cascaded applications.

Digital Filter

Figure 5:
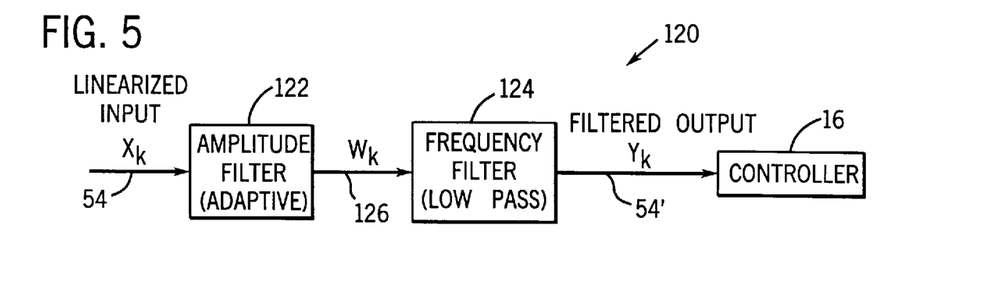
FIG. 5 is a schematic block diagram of an improved digital filter according to another preferred embodiment of the present invention.

Referring to FIG. 5, a block schematic diagram of an improved digital filter utilized in conjunction with the feedback controller of the present invention is shown generally at 120. Preferably, the filter 120 is implemented to filter the process variable signal 54 before the signal is input into the controller 16 for PID control purposes. The filter 120 includes an adaptive amplitude filter 122 and a low pass frequency filter 124. The filters 122, 124 filter the input 54 to produce a filtered output 54' that is input into the controller 16 for control purposes.

Initially, the raw input signal 54 is passed through the adaptive digital amplitude filter 122 to clip signal spikes and glitches in the sampled signal of the process output signal 54. The amplitude filtering is accomplished without introducing any phase lag into the measured signal. The signal clipping helps to prevent the integral and derivative terms in the PID output signal 40 from taking on large, incorrect values following a signal spike, a communications dropout, or a measurement glitch.

The amplitude filter 122 limits how much the filtered output is permitted to change from one sample to the next. The filter limits the output by having a characteristic window that allows small changes in the raw input to pass, but that clips larger input changes. If the actual signal value changes rapidly, the window width is allowed to expand according to the transient nature of the data. Preferably, the initial threshold or window can be made relatively small, thereby allowing most of the medium to large amplitude noise to be rejected.

After the amplitude spikes and glitches are clipped in the raw input signal 54, the filter outputs a signal $W_K$ at 126, which is passed through the $n^{th}$ order low pass digital filter 124. Typically, the filter 124 is either a first or second order low pass filter, as higher order filters increase computation and memory requirements. However, it should be understood that a higher order filter could be used. If a first order filter is used, the filter is a simple exponential filter. If a second order filter is used, the filter is preferably a Butterworth type filter. The filter 124 introduces minimal phase lag and rejects noise above a specified cutoff frequency. The highest frequency that can be removed by the filter is limited only by the sampling rate of the analog input. The default cutoff frequency, which is determined by the analog input sample rate, can be tailored according to the specific application by specifying if the process is fast, normal or slow.

It should be appreciated that an operator can specify whether one or both of filters 122, 124 should be utilized. In most cases, the best performance will be obtained using both filters.

Figure 6:
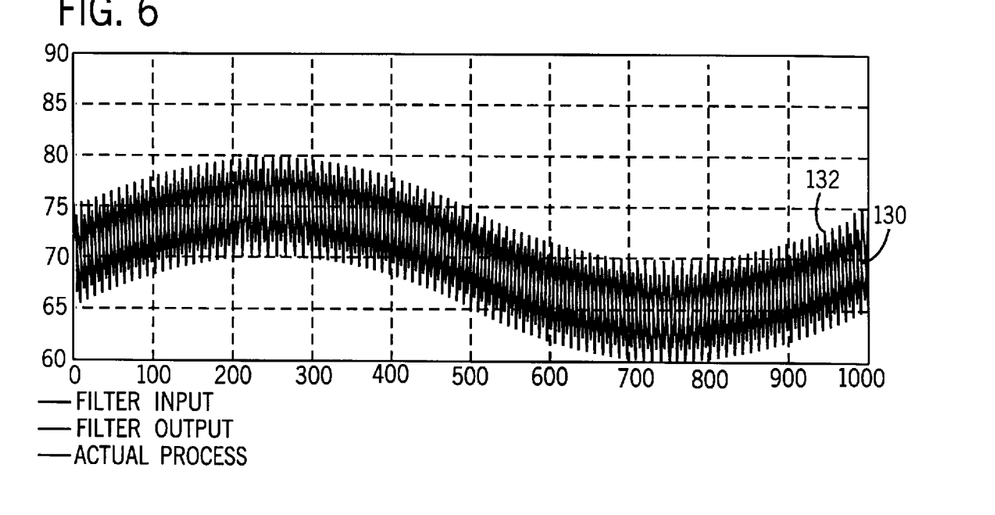
FIG. 6 is a graph showing a first signal input along with associated signal noise versus time.
Figure 7:
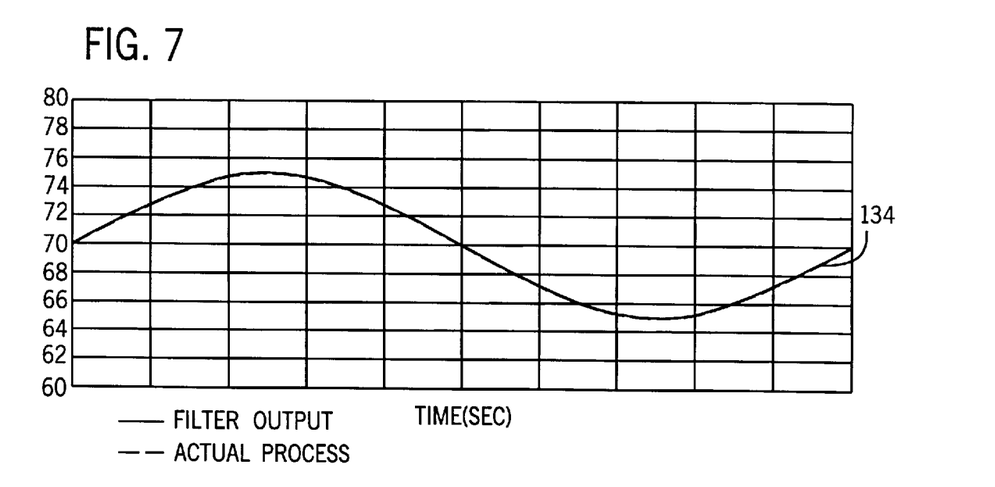
FIG. 7 is a graph of the signal input of FIG. 6 after the signal has passed through the digital filter of the present invention.

FIGS. 6–10 illustrate how the digital filter of the present invention is able to recover the original process information from the very noisy input signal. FIG. 6 shows a 0.001 Hz process at 130 input into the filter 120, along with associated 0.4 Hz noise of equal amplitude superimposed over the signal at 132. For purposes of this and the following discussion, the actual process signal and the signal input into the filter are shown as being essentially equivalent. FIG. 7 shows the subsequent filtered output from the filter at 134.

Figure 8:
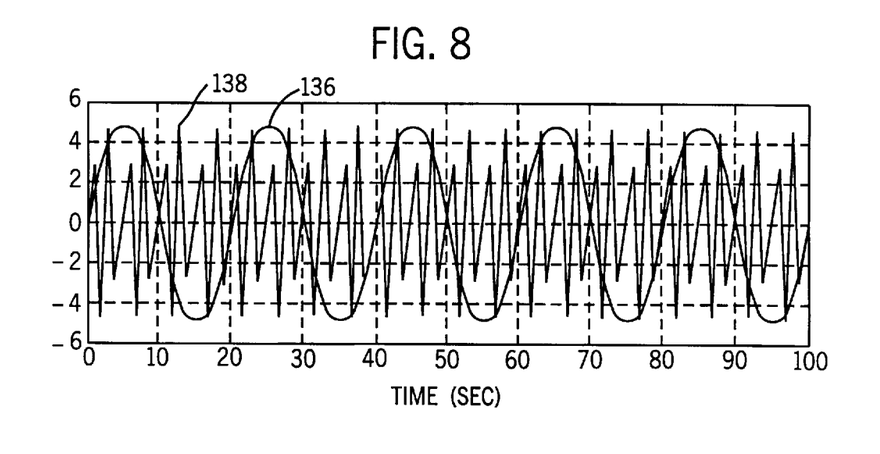
FIG. 8 is a graph of a second signal input to the digital filter of the present invention, along with associated signal noise.
Figure 9:
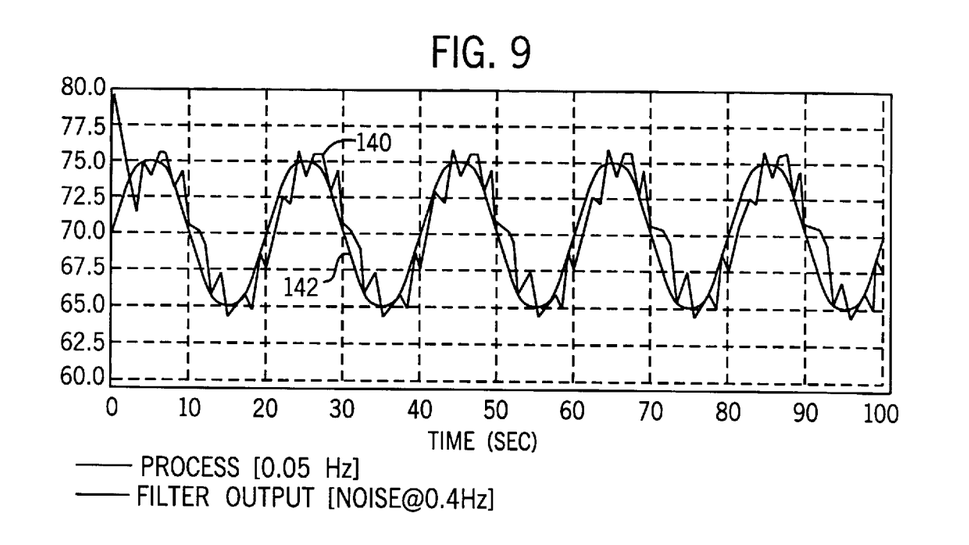
FIG. 9 is a graph of the signal and associated noise of FIG. 8 after the signal and noise are output from the digital filter of the present invention.

Similarly, FIG. 8 shows a 0.05 Hz process at 136 input into the filter 120, with 0.4 Hz noise of equal amplitude superimposed over it at 138. FIG. 9 shows the subsequent output from the filter at 140, as compared to the actual process at 142.

Figure 10:
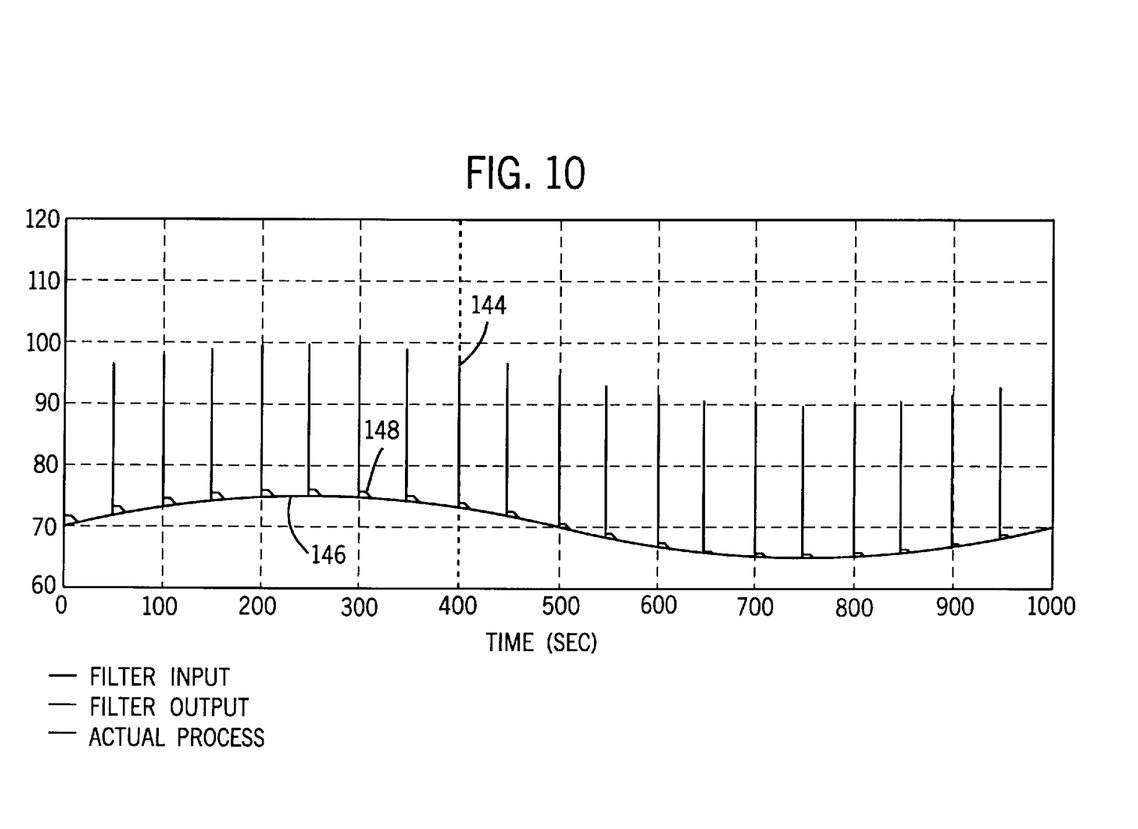
FIG. 10 is a graph that illustrates operation of the amplitude filter portion of the improved digital filter of the present invention.

Referring to FIG. 10, a spiked signal 144 is input into the filter of the present invention. The resulting filtered output signal is almost identical to the actual process signal 146 except for small bumps, such as that shown at 148, at the time intervals associated with the original input spikes. FIG. 10 thus illustrates how well the amplitude filter rejects erratic signals, and preserves the original process variable signal.

Figure 11A:
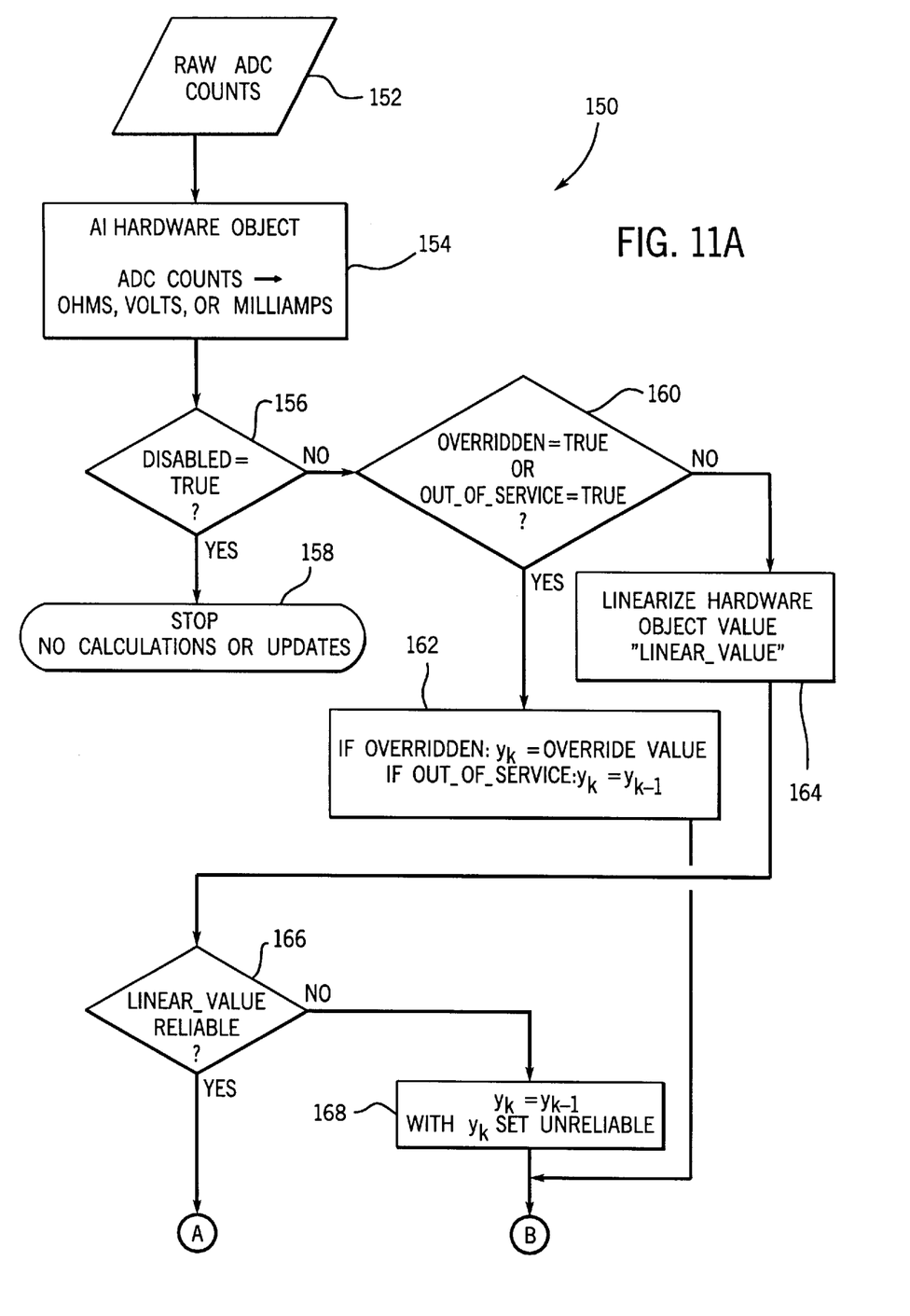
FIGS. 11A–11C illustrate a flow diagram of the methodology of the improved digital filter of the present invention.
Figure 11B:
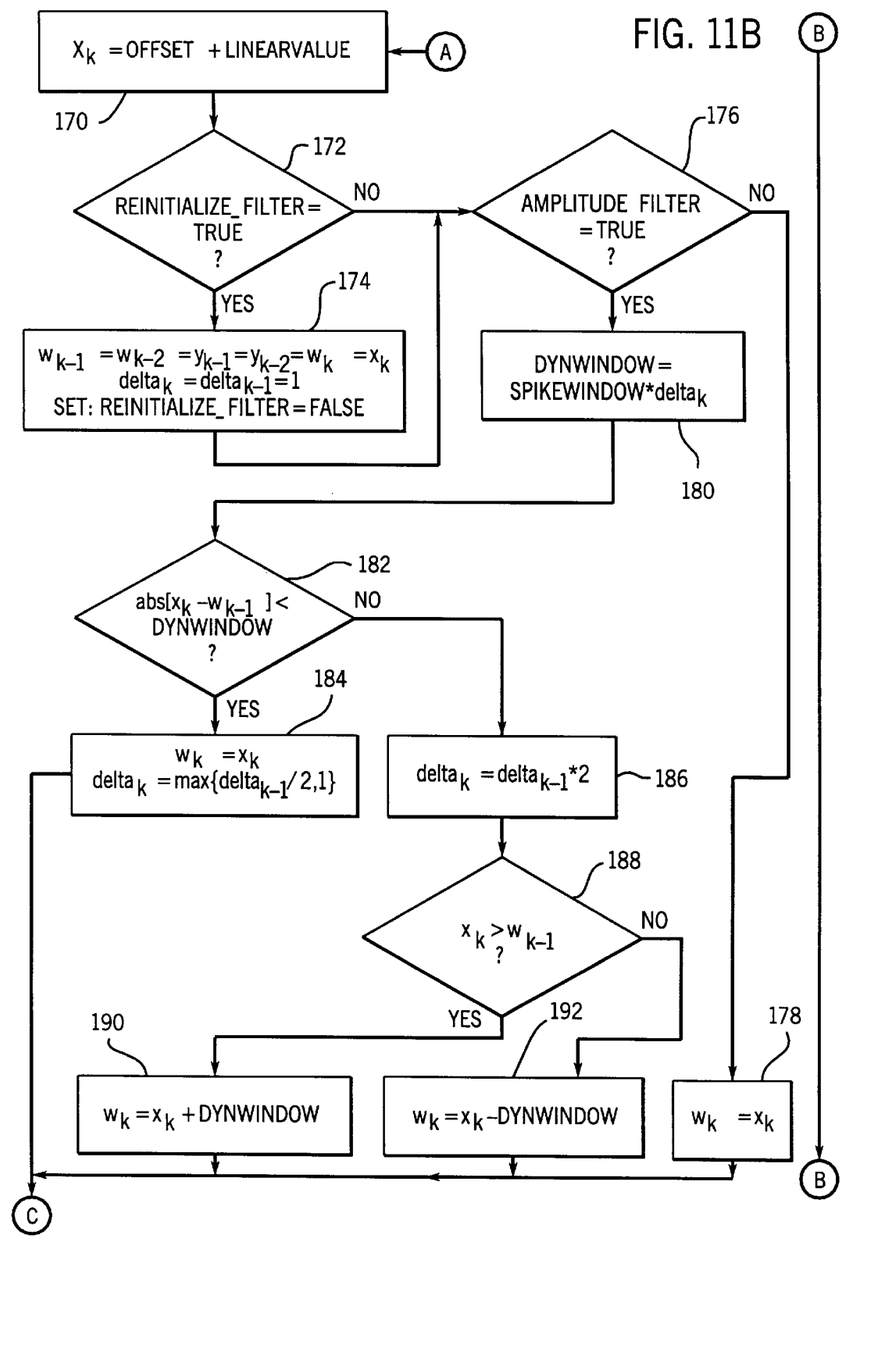
Figure 11C:
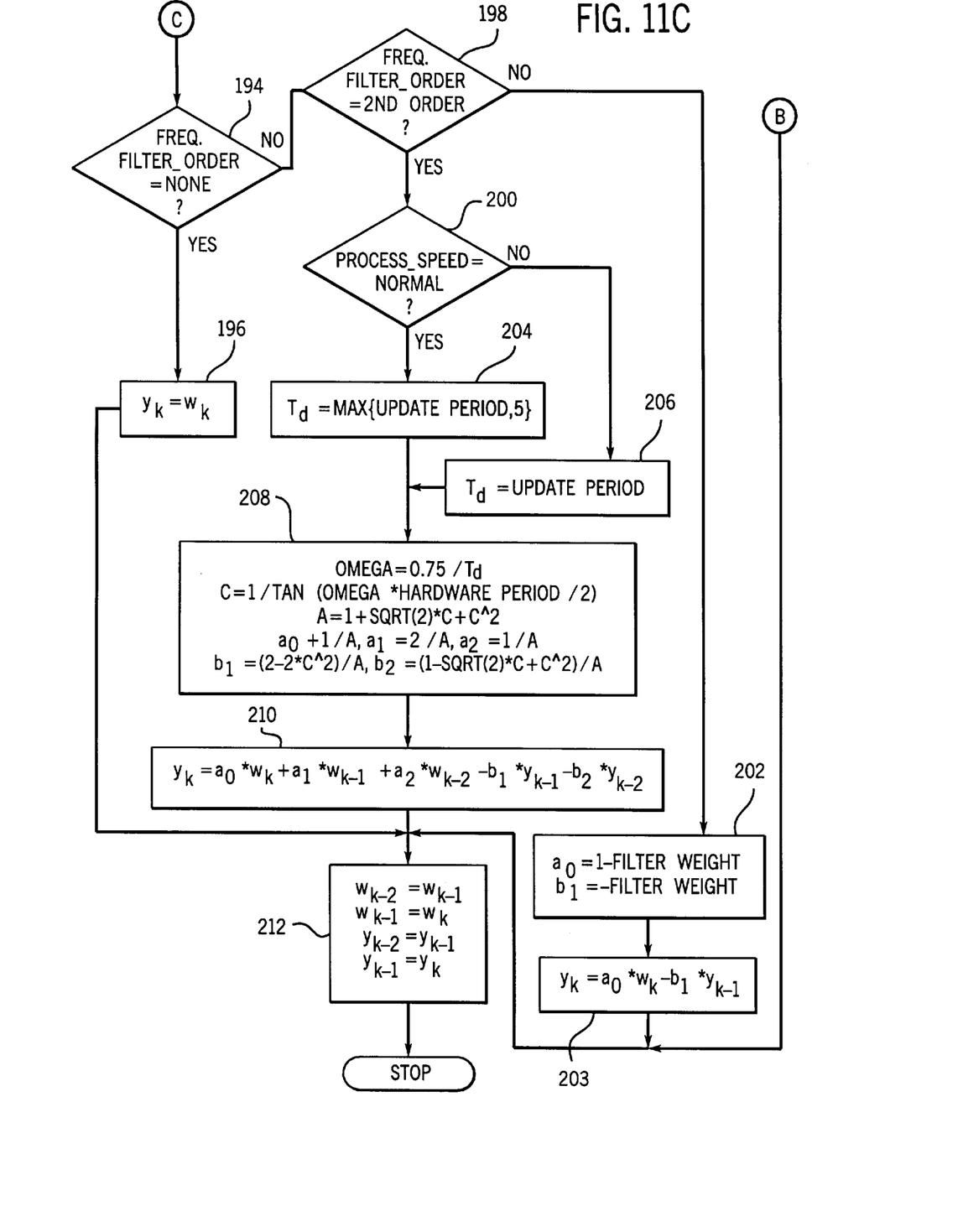

Referring to FIGS. 11A–11C, a flow diagram illustrating the methodology associated with the digital filter of the present invention is shown generally at 150. Each of the blocks shown represents a specific set of instructions programmed into the controller via conventional software programming techniques.

Referring to the block 152, raw signal data counts are input from an analog to digital converter associated with the sensor 52. At the block 154, an AI Hardware Object, which is a piecewise linear table, converts ADC counts from block 152 to sensor output units, such as ohms, dc volts, or milliamps. Subsequently, the block 156 redirects the control logic flow based on whether the analog input (AI) is currently disabled. If disabled, the AI output is not calculated or updated per block 158. Otherwise, the control logic is passed to block 160.

The block 160 redirects the control logic flow based on whether the analog input is either overridden or out of service. If overridden or out of service, the logic is passed to block 162. Otherwise, the control flow proceeds to block 164.

If the analog input is overridden, the current filter output $y_k$ is set to override value at block 162. If the analog input is taken out of service, the current filter output $y_k$ is set equal to the previous filter output $y_{k-1}$. If the logic proceeds directly to block 164, the block 164 linearizes and converts the hardware object (ohms, dc volts, milliamps) into the process variable units (degrees, psig). Because conventional sensors have non-linear relationships between their outputs and the process variable inputs (RTDs or thermocouples), linearization is important. The output from block 164 is referred to as Linear-Value.

The block 166 redirects the control logic flow based on the reliability of the Linear Value variable. If the Linear Value is unreliable, then the logic passes to block 168. If the linear value is reliable, the logic passes to block 170. At block 168, the filter output $y_k$ is set equal to the previous reliable filter output $y_{k-1}$ and it is flagged as unreliable. Alternatively, the block 170 is used to perform a single point calibration to compensate for system variables, such as wiring resistance. The calibration is accomplished by adjusting the offset variable to the difference between an independent process variable measurement and the present value of the filter output $y_k$. The output of block 170 is a linearized and calibrated variable denoted as $x_k$.

Subsequently, the block 172 redirects the control logic flow based on the status of a binary variable referred to as Reinitialize Filter. The value of Reinitialize Filter is TRUE for one sample after a change to one of the following conditions:

- override condition ended
- amplitude filter enabled
- startup or reference value "Spike Window" relating to amplitude filter is changed
- either $1^{st}$ or $2^{nd}$ order frequency filter enabled
- Process Speed attribute of $2^{nd}$ order frequency is changed
- AI update period change
- AI returned to service after having been out of service If Reinitialize Filter is TRUE, the logic flows to block 174. Otherwise, if the Reinitialize Filter is FALSE, the logic flows to block 176.

The block 174 provides a continuous or bumpless change in the AI output by forcing the current and past values of the amplitude and frequency filters equal to the value of $x_k$. The past and present amplitude filter adaptive weights (delta$_k$ and delta$_{k-1}$) are also set equal to 1. The block 176 redirects the control logic flow based on whether the amplitude filter is TRUE. If FALSE, the control flow passes to block 178. If TRUE, the control flow passes to block 180. The block 178 sets the output of the amplitude filter $w_k$ equal to its input value $x_k$ because the amplitude filter is not being utilized. Alternatively, the block 180 determines the width of the amplitude filter pass band. The width is the product of the reference "Spike Window" and a dynamic variable deltak. The value of Spike Window is a function of the measurement type and typical levels of measurement noise, and is determined a priori. The value of delta$_k$ has an initial value of 1, but can change automatically.

If the control flow passes through block 180, the flow subsequently passes to block 182. The block 182 redirects the control flow based on the absolute value of the difference between the current spike filter input $x_k$ minus the prior value of the spike filter output $w_{k-1}$. If this value is less than the width of the pass band, the control flow passes to block 184. Otherwise, the logic passes to block 186. The block 184 sets the amplitude filter output equal to its input, as the difference described with respect to block 182 is within the pass band. The adaptive amplitude filter weight is also reduced by a factor of 2 with a lower limit of 1. This reduction reduces the width of the pass band when the changes in the amplitude filter are small. The block 186 increases the value of deltak by a factor of 2. Thus, the width of the pass band for the next sample will also be doubled. This allows the amplitude filter to quickly resize in the event that the process variable changes quickly. If the control flow proceeds through block 186, the flow subsequently passes to blocks 188 and 190 or 192. At block 188, if the current input $x_k$ is greater than the last amplitude filter output $w_{k-1}$, then it is determined that the input has risen quickly and the amplitude filter output $w_k$ will be clamped as shown in block 190. If the current input $x_k$ is less than the last amplitude filter output $w_{k-1}$, then it is determined that the input has fallen quickly and the amplitude filter output $w_k$ will be clamped as shown in block 192.

Subsequently, the control flow passes to block 194. At block 194, the variable Filter Order specifies the type of frequency filter to be used. Filter Order can take one of the three following enumerated values: NONE, $1^{st}$ order, or $2^{nd}$ order. If Filter Order equals NONE, then no frequency filtering is required and the control flow is passed on to block 196. Otherwise, the control flow passes to block 198. If the control flow passes to block 196, the block 196 sets the output of the frequency filter $y_k$ equal to the frequency filter input $w_k$. If the control flow passes to block 198, the block 198 determines if the Filter Order is equal to a $1^{st}$ or $2^{nd}$ order frequency filter. If Filter Order is equal to a $2^{nd}$ order, then the control flow passes to block 200, which enables a $2^{nd}$ order Butterworth filter. The Butterworth filter is preferably implemented using a bilinear transformation. Otherwise, a $1^{st}$ order frequency filter is required and the control flow passes to block 202.

The block 202 calculates the two constant coefficient parameters needed to implement the first order filter. Subsequently, the block 203 calculates the output of the first order frequency filter $y_k$ based on the current filter input $w_k$ and the past filter output $y_{k-1}$.

If the control logic at block 198 determines that the Filter Order is equal to $2^{nd}$ order, the block 200 sets the cutoff frequency of the $2^{nd}$ order filter through the use of an enumerated variable Process Speed. This variable can have two values, either NORMAL or FAST. If process speed is NORMAL, then the control flow is passed to block 204. Otherwise, the control flow passes to block 206. At block 204, the cutoff period $T_d$ for a NORMAL speed process is determined. The value of $T_d$ will typically be five seconds for typical default values of the Update Period. It can be changed, however, if the value of the Update Period is increased to values greater than five seconds. The block 206 determines the cutoff period $T_d$ for a FAST process. The value of $T_d$ will typically be set to the sample period for the A/D converter since this gives the highest possible cutoff frequency.

Subsequently, the control logic proceeds to block 208. The block 208 determines the cutoff frequency and the bilinear transformation parameters needed to implement the second order digital Butterworth filter. Subsequently, the block 210 calculates the output of the second order of frequency filter $y_k$ based on the current and past two values of the frequency filter input ($w_k$, $w_{k-1}$ and $w_{k-2}$) and the last two values of the frequency filter output ($y_{k-1}$ and $y_{k-2}$).

Subsequently, control logic proceeds to block 212, which saves the data for future use in the frequency filter calculations.

Upon reading the foregoing description, it should be appreciated that although the digital filter of the present invention is described as being implemented in conjunction with a PID process variable control system, the digital filter may be implemented in any application requiring noise to be filtered from a raw input signal.

In summary, the digital filter of the present invention significantly reduces both high frequency noise and noise attributed to unrealistic changes in signal amplitude for a system input signal, without introducing a significant phase lag into the measurement signal. The digital filter of the present invention thereby simplifies system computational processes and increases system computational accuracy.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

We claim:

1. A control system comprising:
    a process regulator that adjusts the value of a process variable in response to a setpoint associated therewith;
    a sensor associated with the process regulator that senses the process variable and that outputs a process variable signal corresponding thereto; and
    a controller connected to both the process regulator and the sensor in a closed loop, the controller being programmed with PID logic to control operation of the process regulator in response to the process variable signal received from the sensor, and to generate a control signal, including proportional, integral and derivative function contributions, that controls the process regulator based on a non-uniform two-point sampling of the process variable signal.

2. The system of claim 1, wherein the controller generates a bumpless control signal after being released from an override condition, after a controller proportional gain is changed and after the controller is switched from a disabled state to an enabled state.

3. The system of claim 2, wherein the controller resets the integral function contribution to provide the bumpless control signal after being released from an override condition, after a change in the proportional gain, and after the controller is switched from a disabled state to an enabled state.

4. The system of claim 1, wherein the PID logic integral function co ntribution is calculated with second order accuracy.

5. The system of claim 4, wherein the controller calculates the integral function contribution through a trapezoidal integration technique.

6. The system of claim 1, wherein the controller integral function contribution minimizes control delay upon the controller returning to a control mode after reaching saturation at either a high or low control limit.

7. The system of claim 6, wherein the controller resets the integral function contribution upon reaching saturation to minimize delay in generating the control signal.

8. The system of claim 1, wherein the process variable comprises a temperature of a climate-controlled zone, and the setpoint comprises a zone temperature setpoint.

9. The system of claim 1, wherein the derivative contribution is generated by the controller through use of the process variable in a finite difference approximation.

10. The system of claim 9, wherein the finite difference approximation utilizes a non-uniform sampling period.

11. The system of claim 1, wherein the controller derivative contribution is limited to minimize the effects of noise through recursive implementation of the following equation:

$$D = -\frac{T_d}{N} \frac{dD}{dt} - KT_d \frac{dy}{dt}$$

where; D is the derivative contribution, $T_d$ is the derivative time, N is a constant which limits possible noise amplification, K is the controller gain, t is time, and y is the value of the process variable.

12. The system of claim 1, wherein the controller includes a built-in saturation detector that allows the controller to be utilized for control flow or logic coordination with additional control devices.

13. The system of claim 1, further comprising a digital filter coupled between the sensor and the controller to filter noise from the process variable signal.

14. The system of claim 13, wherein the digital filter comprises an adaptive amplitude filter that clips signal spikes and glitches in the process variable signal; and a low pass frequency filter coupled to the amplitude filter that filters high frequency noise from the process variable signal, thereby increasing computational speed and reducing memory requirements for the control system.

15. The system of claim 14, wherein the amplitude filter includes a window that permits small changes in the process variable signal, but that clips large changes in the process variable signal, the window width expanding exponentially according to the transient nature of the process variable signal.

16. The system of claim 14, wherein the frequency filter comprises a first order exponential filter.

17. The system of claim 14, wherein the frequency filter comprises a second order Butterworth filter that introduces minimal phase lag to the process variable signal, and rejects noise from the process variable signal above a predetermined cutoff frequency.

18. The system of claim 17, wherein the second order Butterworth filter includes a characteristic cutoff frequency limited by the sampling rate of the process variable signal and determined by the input rate of the process variable signal.

19. A feedback control method, comprising the steps of:

setting a process setpoint at a desired value;

determining deviation of a process variable from the process setpoint via a non-uniform sampling of the process variable; and controlling the process variable in response to said step of determining deviation of a process variable to reduce the deviation in a manner that minimizes setpoint overshoot and undershoot wherein said controlling is accomplished via digital Proportional integral derivative (PID) logic that produces a control signal having a proportional function contribution, an integral function contribution and a derivative function contribution.

20. The method of claim 19, further comprising the step of calculating the integral contribution via a trapezoidal integration technique.

21. The method of claim 19, where in the step of determining deviation from the process setpoint via a non-uniform sampling of the process variable comprises calculating a finite difference approximation for the derivative contribution via the non-uniform sampling of the process variable.

22. The method of claim 19, further comprising the step of determining that saturation has been reached during the step of controlling the process variable when the control output has not changed from a high or low output limit for a predetermined period of time.

23. The method of claim 19, further comprising the step of resetting the integral function contribution as needed to provide a bumpless control output subsequent to state or parameter changes.

24. The method of claim 19, further comprising the step of filtering an input signal containing the process variable to minimize signal noise.

25. The method of claim 24, where in the step of filtering an input signal comprises the step of digitally filtering the signal to both clip signal spikes and signal glitches, and to eliminate high frequency signal noise.

26. The method of claim 25, wherein the step of filtering the input signal to clip signal spikes and glitches and further includes the step of exponentially expanding a filter window to accommodate rapid changes in signal value.

* * * * *